Jan. 24, 1961       M. G. DUNCAN       2,969,530
SOUND MONITORING CIRCUITRY AND INSTRUMENT
Filed Jan. 28, 1959

MYRON G. DUNCAN
INVENTOR.

BY  B. B. Olive
ATTORNEY

_United States Patent Office_ 2,969,530
Patented Jan. 24, 1961

2,969,530

SOUND MONITORING CIRCUITRY AND INSTRUMENT

Myron G. Duncan, 813 Lochridge Road, Charlotte, N.C.

Filed Jan. 28, 1959, Ser. No. 789,639

6 Claims. (Cl. 340—261)

This invention is concerned with an improved instrument and sound monitoring circuitry for monitoring the level of sound produced in speaking, singing and the like in which achievement of a desired level or volume of sound is indicated by a visual signal.

In the various forms of voice projection such as conversation, public speaking and singing, it is desirable to know that the voice is being projected with sufficient volume for the particular environment. That is, once consideration has been given to such factors as the size of the audience, the size and arrangement of the room or auditorium in which the voice is being projected, the acoustical properties of the room, the ambient noise and the like, it is desirable to assume some particular level of sound projection from the voice as being preferred and, once so established, it is desirable to monitor this level and furnish some easily recognized signal whenever the voice falls below the preferred level.

The oldest means of monitoring voice projection in the manner stated is the well known practice of stationing a second person to hear the voice and signal in some manner whenever the voice falls below the desired level. A more modern practice is the use of one of the various decibel measuring instruments in which an instrument needle gives visual indication of the level. Other forms of visual indication in such instruments have also been proposed. However, considering the importance of voice projection in its many fields such as in legal work, singing, selling, the ministry, civic work and the like, it is believed that none of such prior instruments meets the need for a relatively inexpensive and compact instrument that can be used by the average individual in measuring the effectiveness of his own voice projection.

The invention, therefore, has as an object the provision of a simple and useful instrument for monitoring voice projection in which a readily perceptible visual signal can be made to indicate the achieving at a particular location of any one of a relatively large range of predetermined and desired levels of sound.

It is a further object to provide an instrument for the purpose mentioned in which the circuitry is adaptable to manufacture at reasonable cost, which is simple in operation and which meets the range of sound conditions normally encountered.

As to the circuit itself, it is an object to provide a circuit for the purposes mentioned that is especially sensitive to change in sound level and in which the output current of the circuit quickly responds to rise in level once such level has exceeded some predetermined level and also quickly responds to drop in level when below such predetermined level, such output current being useful for indicating such changes.

Other objects of the invention will become apparent as the description proceeds and for a full understanding of the invention, reference is now made to the following description and drawings in which.

The instrument consists of a case housing a microphone that serves to receive the sound being measured and, further, housing circuitry connected with the microphone and including an incandescent lamp that is immediately energized and continues to glow so long as such sound maintains a predetermined level as established by the positioning of a manually operated biasing control residing on the front of the case. By suitable positioning of the control the lamp can, for example, be made to respond to a whisper or, as a further example, the control can be positioned so as to make the lamp responsive only to a very high level of sound such as a shout.

Figure 1:
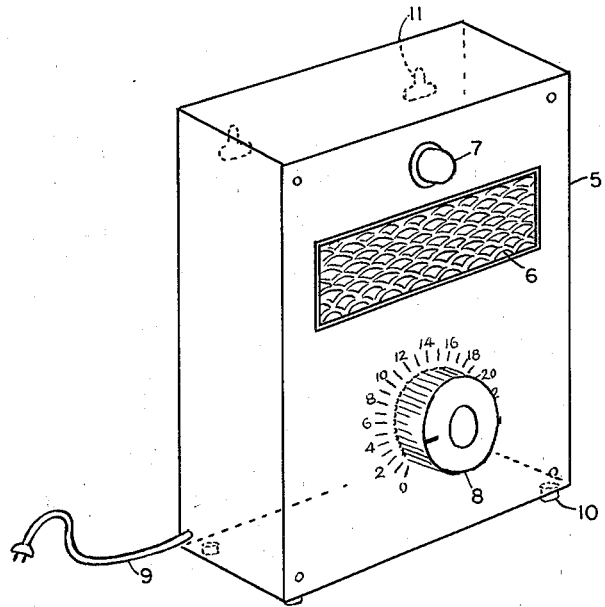
Fig. 1 represents a perspective view of an instrument embodying the invention.

Referring to Fig. 1, the instrument is preferably constructed with a case 5 in which a microphone 6 is located along with the signal lamp 7 that is energized and glows whenever the sound level received by microphone 6 reaches some predetermined level, as established by positioning the manual control 8 shown mounted on the front of the case 5. As later explained, the control 8 rotates and acts both as an on-off switch for the entire circuit as well as a means of controlling the level at which the lamp 7 is energized. The instrument includes a power lead 9 which, in operation, is connected to a suitable power source such as 110 volts, 60 cycle alternating current. Once connected and prepared for operation, the case 5 may be supported upright on the legs 10 preferably taking the form of rubber feet attached to the bottom of the case 5, or may be hung on suitably spaced hooks, screws or the like matching the mounting holes 11 which should be understood as being formed in the rear wall of the case 5 opposite the wall containing the microphone 6.

Figure 2:
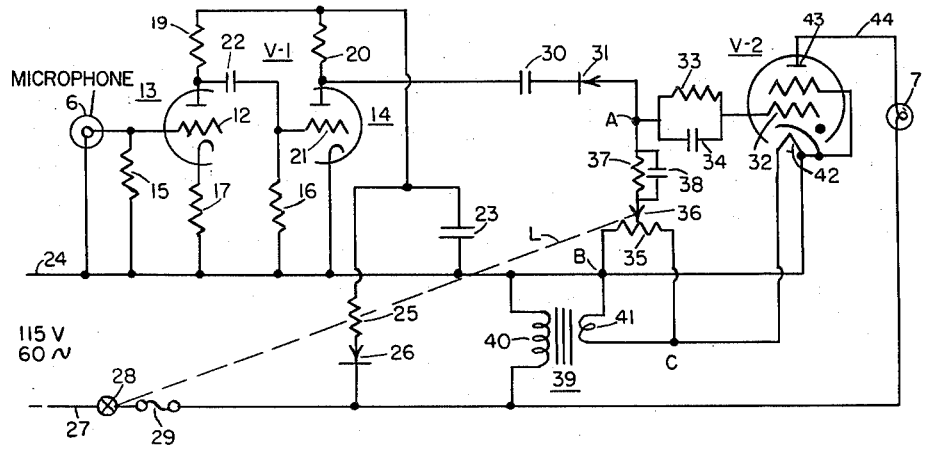
Fig. 2 is a schematic circuit diagram showing the circuit features of a sound measuring instrument arranged in accordance with the invention.

The circuitry is schematically shown in Fig. 2 in which microphone 6 is shown connected to grid 12 of a two stage amplifier V-1, including a left section 13 and a right section 14. The amplifier V-1 further includes grid leak resistors 15 and 16, grid bias resistor 17 and plate load resistors 19 and 20. The output of the left section 13 is fed to the grid 21 of the right section 14 through coupling capacitor 22 and power is supplied to the amplifier V-1 by means of the power supply network including capacitor 23 connected to the ground lead 24 and resistor 25 in series with rectifier 26 connected to a second lead 27. This portion of the circuit further includes a rotary on-off switch 28 and a fuse 29, both located in line 27, switch 28 being positioned by control 8 shown in Fig. 1. Since the amplifier V-1 as described can be seen to be a conventional two stage resistance coupled audio frequency amplifier, it is not deemed necessary to resort to further description as far as this portion of the circuit is concerned.

As further illustrated in Fig. 2, the output of the amplifier V-1 is fed through a coupling capacitor 30 in series with a rectifier 31 to a junction point A. From point A connection is made to grid 32 of a thyratron tube V-2, this connection being through a parallel R-C network including resistor 33 and capacitor 34. From point A connection is also made to an adjustable biasing resistor 35 having a sliding contact 36, contact 36 and switch 28 being on a common shaft represented by dashed line L, positioned by control 8 (Fig. 1). The connection between point A and biasing resistor 35 is made through a second parallel R-C network formed by resistor 37 and capacitor 38. In order to furnish a filament voltage to thyratron tube V-2 and to develop a bias voltage across biasing resistor 35, there is provided a transformer 39 having a primary winding 40 connected between the leads 24 and 27 and a secondary winding 41 having lead connections at points B and C, which places the secondary transformer voltage across biasing resistor 35 and across thyratron filament 42.

With the description of the amplifier and thyratron circuits thus far given it can be seen that, in general, the circuits provide a means for receiving and amplifying an audio signal and applying this as a pulsating D.C. voltage excitation to the grid of a thyratron tube, such grid also having a continuous alternating current voltage grid excitation. In order to utilize the signalling characteristic of such circuitry, the plate circuit of the thyratron tube V–2 is impressed with an alternating current voltage excitation obtained by connecting plate 43 to line 27 through line 44 and lamp 7, the transformer 39 connections and the connections to plate 43 and biasing resistor 35 being such as to place the respective alternating current voltage excitations applied to the grid and plate substantially 180° out of phase.

While it is not desired to be limited to specific values and types in the circuit components, a satisfactory and sensitive circuit has been obtained with the following particular components being used in association with the thyratron and a 115 volt, 60 cycle source: capacitor 30, rated .01 microfarad at 400 volts; rectifier 31, germanium diode type 1N34; resistor 33 rated 1 megohm, ½ watt; capacitor 34, rated .005 microfarad at 400 volts; resistor 37 rated 470 kilohms, ½ watt; capacitor 38 rated .01 microfarad at 400 volts; biasing resistor 35 rated 500 kilohms, ½ watt; transformer 39 rated 115/6.3 volts at 1 amp.; lamp 7 rated 115 volts at 6 watts and thyratron tube V–2 being a type 502A as manufactured by the General Electric Company of Schenectady, New York.

In operation, the instrument is placed at the location where it is desired to measure the level of sound, with the microphone 6 and signal lamp 7 facing the source of the sound, e.g. with a person speaking from the front of the auditorium, the instrument may be placed on the legs 10 or mounting holes 11 at the rear of the auditorium with the microphone 6 facing the speaker and suitable connection made with a power supply through lead 9. With the instrument so placed and connected, control 8 is rotated, which acts to close switch 28 and to position sliding contact 36. With switch 28 on, it will be apparent that amplifier V–1 is energized and made ready to receive and amplify any audio-signal received by microphone 6. With the circuit energized as described, an alternating current voltage excitation amounting to the full line voltage is applied to the plate circuit of thyratron tube V–2. Therefore, considering the plate circuit alone and assuming a 60 cycle voltage is used, it can be seen that the plate becomes negative with respect to the cathode of the thyratron tube V–2 sixty times per second and is, therefore, permitted to extinguish itself at this rate. Next considering the grid of thyratron tube V–2, this too can be seen to have an alternating current voltage excitation derived from the secondary winding of transformer 39 and controlled in amount by the positioning of sliding contact 36 with maximum grid bias excitation being imposed when sliding contact 36 is at the extreme right of resistor 36.

Referring now to the series network formed by coupling capacitor 30 and rectifier 31, it will be seen that any alternating audio-signal amplified by amplifier V–1 and reaching this network will result in a type of direct current signal pulse reaching point A which, in turn, causes a direct current voltage to be developed between points A and B with the amplitude of this voltage being controlled by the amplitude of the amplified audio-signal. This direct current voltage developed between A and B will then, depending on its amplitude, cause the thyratron tube V–2 to fire and remain conducting on each positive cycle of the alternating current voltage applied to the plate 43 so long as this direct current voltage is sufficiently high. With tube V–2 conducting on each such positive cycle, lamp 7 will be energized and, with a 60 cycle source, will appear as a constant glow, thus signifying that the voice level being received is of sufficient volume.

In the series network formed by coupling capacitor 30 and rectifier 31, it should be noted that the rectifier 31 acts to prevent the passing of the negative portions of the audio-signal and thus the thyratron tube grid excitation contributed by the audio-signal is always of a relatively positive nature tending to fire the thyratron tube V–2. Since a thyratron tube is inherently incapable of instantaneously cutting on and off, the presence of the rectifier 31 prevents the pasing of negative portions of the audio-signal whose tendency would otherwise be that of initiating an off cycle that could not be instantaneously overcome, in which case signal lamp 7 might be off at a time when the desired level was actually present.

Of further significance is the parallel network including the resistor 33 and the capacitor 34 which permits only a relatively low grid current in thyratron tube V–2 but, at the same time, permits the grid voltage to rise quickly as a result of any applied direct current voltage due to amplified audio-signals received by microphone 6. It has been found that, without this network of resistor 33 and capacitor 34, the signal lamp 7 tends to remain on for several seconds after loss of the audio-signal, whereas with the network the lamp appears to go off immediately upon loss of the audio-signal. Further, the use of this network makes the instrument much more sensitive in that a slight increase in bias at any given sound level will prevent the signal lamp 7 from being energized whereas, without this network, a considerable increase in grid bias is required to prevent signal lamp 7 from coming on at any given level of sound. From the viewpoint of the customary "dead zone" between the firing and extinguishing characteristic operating curves of the thyratron, such "dead zone" is materially reduced with the use of this network.

Referring next to the parallel network including resistor 37 and capacitor 38, it will be seen that the resistor 37 with the resistor 33 provides a direct current path between the grid and cathode of the thyratron tube, while the capacitor 38 provides an additional alternating current path for the pulsating voltage applied to the grid. Further, with the network there is provided a load across which the rectified signal is developed and in which the R.C. time constant is long enough to permit instantaneous signal peaks to remain long enough to cause the lamp 7 to glow. However, the capacitor 38 shunts out high frequency components which would tend to make the light glow before a long duration sound component was actually picked up. This network also provides sufficient impedance to prevent the signal pulses from being shorted out before reaching the grid and, in addition, from the viewpoint of sensitivity, considerably improves this characteristic.

To adjust the instrument to a desired level it has been found advantageous to follow the procedure of starting with the sliding contact 36 in the position of maximum bias. In this position, the signal lamp 7 will be dark and, assuming a speaker or other source of sound is being projected and received by the instrument, the sliding contact 36 may be moved so as to gradually decrease the bias until a point is reached at which the lamp 7 is energized. The contact 36 may then be left in this position and, so long as the corresponding level of sound is maintained, the signal lamp 7 will continue to glow. Adjustments to other levels of sound may be obtained through the same procedure and, with proper manipulation of the control, signal lamp 7 can be made to respond to many different levels of sound such as a whisper or a shout. If desired, the sliding contact 36 may be calibrated in arbitrary numerical units or in decibels to show the actual sound level at which the lamp begins to glow.

While a specific embodiment of the invention has been shown and various terms have been used, the same have been included as being used in a generic sense and not in the sense of limitation, the invention being as hereinafter set forth in the claims.

I claim:

1. In an instrument for monitoring sound level of the circuit type having a sound pickup, an amplifier coupled therewith and emitting alternating signal currents corresponding to said level, an alternating current voltage supply, a gaseous discharge tube including a plate and grid, means exciting said plate and said grid from said supply, said grid excitation being substantially 180 degrees out of phase with said plate excitation, control means to adjust the value of said grid excitation, a coupling between said amplifier and said grid, said coupling converting said signal currents to a pulsating direct current voltage tending to cause said grid to fire said tube, the improvement comprising in combination with the aforesaid of a visible signal lamp in series with said plate, said lamp being energized by said supply upon the firing of said tube, a pair of parallel resistor-condenser networks connected in series between said grid and said control means and through a common terminal between said pair connected to said coupling, thereby making the operation of said grid immediately responsive to the presence and absence of said signal currents and the position of said control means, the firing and extinguishing of said tube and energization of said lamp for each such position being an automatic continuous sequence as determined by the amplitude of said signal currents.

2. In an instrument for monitoring sound level, a case, a visible signal lamp and microphone mounted on said case and normally facing the source of said sound, and of the circuit type having an alternating current voltage supply, a switch connecting said supply to said instrument, an amplifier connected with said microphone and producing an alternating signal having an amplitude corresponding to said level, a thyratron gaseous discharge tube including a plate and a grid, said plate being excited by said supply and being in circuit with said lamp, transformer means connected to said supply exciting said grid with an alternating voltage substantially 180 degrees out of phase with said plate excitation and including adjustable resistor means between said transformer means and said grid determining the amount of said grid excitation, the improvement comprising in combination with the aforesaid of manually operated control means mounted on said case enabling said resistor means and said switch to be positioned therewith, a first network including a condenser and rectifier in series, said first network being in series with a second network including a resistor and condenser in parallel, said first and second networks being connected between said amplifier and said resistor means, a third network including a resistor and condenser in parallel and connected between the junction between said first and second networks and said grid, said networks acting in combination whereby said lamp is immediately energized upon said signal reaching a predetermined level and is immediately de-energized upon said signal dropping below said predetermined level, said predetermined level being established by the position of said resistor means and said position acting to simultaneously control both the amount of said grid excitation and the attenuation of said signal.

3. An instrument for visually indicating the presence of sound above a predetermined level of the circuit type comprising an alternating current voltage supply, a housing, a microphone, a visible signal lamp and master control mounted on said housing, a switch for connecting said supply to said instrument, said switch being positioned by said control, an amplifier converting said sound to an alternating current signal corresponding thereto, a gaseous discharge tube including a control grid and plate, said grid and plate being excited from said supply, said grid excitation being substantially 180 degrees out of phase with said plate excitation, the improvement comprising in combination with the aforesaid resistor means connected to said supply and positioned by said control for regulating said grid excitation, coupling means between said amplifier and said grid including in series a condenser and rectifier, a first parallel resistor and condenser network connected between said resistor means and a point intermediate of said coupling means and said grid, a second parallel resistor-condenser network connected between said point and said grid, connecting means placing said lamp in series with said plate, the energization of said lamp being immediately responsive to attainment and loss of said level, said level being established by the position of said resistor means and said position acting to control both the amount of said grid excitation and attenuation of said signal.

4. An instrument for giving a positive visual indication of sound being above or below a predetermined level, said instrument being of the circuit type comprising an alternating current voltage supply, a switch for connecting said supply to said instrument, a microphone for receiving said sound, an amplifier for converting said sound to alternating signals corresponding thereto, a gas tube of the grid control type including a plate, means exciting said grid and said plate from said supply, said grid being excited with a reduced voltage substantially 180 degrees out of phase with voltage exciting said plate and tending to restrain firing of said tube, the improvement comprising in combination with the aforesaid of regulating means for changing the value of said reduced voltage, a visible signal lamp in series with said plate and connected to said supply through said tube, single control means for operating said switch and positioning said regulating means, a coupling between said amplifier and said grid, said coupling readily passing only that portion of said signals tending to fire said tube, parallel resistor-condenser networks connecting said grid and said supply and intermediate of said grid and said coupling thereby making said grid immediately responsive to said signals and the position of said regulating means, said position being determinative of said predetermined level by simultaneously controlling both the amount of said reduced voltage and the attenuation of said signals and said lamp being immediately energized upon said sound reaching said level and immediately de-energized upon said sound going below said level.

5. In a sound monitoring circuit of the type having an alternating current voltage supply, a sound pickup, an amplifier coupled therewith and having an alternating signal output corresponding to said sound, a thyratron gaseous discharge tube including a plate and grid, said plate being excited by said supply, a visible signal lamp in series with said plate and connected to said supply through said tube, transformer means connected to said supply exciting said grid with a voltage substantially 180 degrees out of phase with said plate excitation and including adjustable resistor means between said transformer means and said grid determining the amount of said grid excitation, the improvement comprising in combination with the aforesaid a first network including a condenser and rectifier in series, said first network being in series with a second network including a resistor and condenser in parallel, said first and second networks being connected between said amplifier and said resistor means, a third network including a resistor and condenser in parallel, said third network being connected between the junction joining said first and second networks and said grid, said networks acting in combination whereby the position of said resistor means acts to simultaneously control both the amount of said grid excitation and the attenuation of said signal output and whereby said lamp is immediately energized upon said signal reaching a predetermined level and it is immediately de-energized upon said signal dropping below said predetermined level, said predetermined level being established by the position of said resistor means.

6. In an instrument for monitoring audible sound of the type having in combinatoin, a sound pickup, an audio-amplifier coupled therewith, an alternating current power supply including a ground lead and a second lead, a gaseous discharge tube including a plate, grid and cathode, said cathode being connected to said ground lead, a visible signal lamp connected in series with said plate and to said second lead, a transformer including a secondary winding having one side connected to said ground lead, the improvement comprising in combination with the aforesaid of adjustable resistor means across said winding, a first parallel resistor-condenser network, a coupling including a condenser and rectifier in series, said coupling being connected between said amplifier and said first network and said first network being further connected to said resistor means, a second parallel resistor-condenser network connected between said grid and a point intermediate of said coupling and said first network, said coupling and networks having predetermined electrical values and said grid and said plate being arranged, with said transformer said coupling and said networks whereby said grid and plate are excited from said supply with voltages substantially 180 degrees out of phase and whereby said grid is further excited by a pulsating direct current voltage corresponding to said sound, said values being selected to cause said grid to be immediately responsive to said sound and the position of said resistor means, the position of said resistor means acting to simultaneously control the amount of excitation of said grid from said supply and the amount of attenuation of said pulsating voltage, the firing and extinguishing of said tube and energization of said lamp being controlled principally by the amplitude of said sound.

References Cited in the file of this patent

UNITED STATES PATENTS

| | | |
|---|---|---|
| 2,308,390 | Ritzmann | Jan. 12, 1943 |
| 2,506,279 | Rowe | May 2, 1950 |
| 2,832,915 | McCoy | Apr. 29, 1958 |

OTHER REFERENCES (Publication) "Radio-Electronics," March 1952, page 97.